United States Patent [19]
Schwartz et al.

[11] Patent Number: 5,960,211
[45] Date of Patent: Sep. 28, 1999

[54] DATA FORMATTING METHOD AND APPARATUS FOR A DATA PROCESSING ARRAY

[75] Inventors: David A. Schwartz, Moorpark; Philip G. Rosen, El Segundo, both of Calif.

[73] Assignee: Hughes Aircraft, Los Angeles, Calif.

[21] Appl. No.: 08/574,087

[22] Filed: Dec. 15, 1995

[51] Int. Cl.[6] .................................................. G06F 15/80
[52] U.S. Cl. ............................. 395/800.22; 395/800.15
[58] Field of Search .............................. 395/800, 800.22, 395/800.04, 800.15

[56] References Cited

U.S. PATENT DOCUMENTS

| | | | |
|---|---|---|---|
| 4,546,429 | 10/1985 | Chan | 395/865 |
| 5,388,214 | 2/1995 | Leiserson | 395/800.15 |
| 5,521,915 | 5/1996 | Dieudonne | 370/60.1 |
| 5,561,784 | 10/1996 | Chen | 395/484 |
| 5,590,356 | 12/1996 | Gilbert | 395/800.22 |

OTHER PUBLICATIONS

"The Distributed Array of Processors (DAP)", Parallel Supercomputing in SIMD Architectures, Chapter 5, pp. 143–164, 1990, CRC Press Inc.

*Primary Examiner*—Eric Coleman
*Attorney, Agent, or Firm*—V. D. Duraiswamy; W. K. Denson-Low

[57] ABSTRACT

Data is reformatted in a memory external to the processing elements of a processing array, relieving the processing array of this task and allowing it to perform its data processing functions more efficiently. Data is transferred to or from the multi-channel memory in a wordstream format, with individual data words mapped into the proper memory channels and the proper addresses within each channel in a matrix format. The invention is applicable to two-dimensional reformatting for data transfers between an input/output port and the memory, and to one-dimensional reformatting for data transfers between the processing array and either the memory or the input/output port. Logic circuitry within each channel selects the proper data words for that channel from a wordstream, and the associated address for each selected word, according to the respective positions of the data words in the wordstream. Data words are assigned to memory channels and to addresses within those channels based upon programmable format specifiers.

42 Claims, 9 Drawing Sheets

FIG. 4.

| Scenario "A" | | | | | | | | |
|---|---|---|---|---|---|---|---|---|
| Chan_ID | 0 | 1 | 2 | 3 | 4 | 5 | 6 | 7 |
| Block | N-1 | N-1 | N-1 | N-1 | N-1 | N-1 | N-1 | N-1 |
| Chan_Row | 20 | 20 | 20 | 20 | 20 | 20 | 20 | 20 |
| Chan_Dwell | 0 | 0 | 0 | 0 | 0 | 0 | 0 | 0 |
| Chan_Start | 0 | 0 | 0 | 0 | 0 | 0 | 0 | 0 |
| Chan_Inc | 1 | 1 | 1 | 1 | 1 | 1 | 1 | 1 |
| Chan_Width | 8 | 8 | 8 | 8 | 8 | 8 | 8 | 8 |
| Chan_Upper | 7 | 7 | 7 | 7 | 7 | 7 | 7 | 7 |
| Addr_Start | 0 | 0 | 0 | 0 | 0 | 0 | 0 | 0 |
| Addr_Inc | 1 | 1 | 1 | 1 | 1 | 1 | 1 | 1 |
| Addr_Width | 0xffffff | 0xffffff | 0xffffff | 0xffffff | 0xffffff | 0xffffff | 0xffffff | 0xffffff |
| Addr_Upper | 0xffffff | 0xffffff | 0xffffff | 0xffffff | 0xffffff | 0xffffff | 0xffffff | 0xffffff |
| Addr_Len | 2 | 2 | 2 | 2 | 2 | 1 | 1 | 1 |
| Addr_Gap | 1 | 1 | 1 | 1 | 1 | 2 | 2 | 2 |

Where N > 63 if finite-block, or for semi-infinite block, 0<N<62, and more than one block is transfered.

| Scenario "B"1 | | | | | | | | |
|---|---|---|---|---|---|---|---|---|
| Chan_ID | 0 | 1 | 2 | 3 | 4 | 5 | 6 | 7 |
| Block | N-1 | N-1 | N-1 | N-1 | N-1 | N-1 | N-1 | N-1 |
| Chan_Row | * | * | * | * | 14 | 14 | 14 | 14 |
| Chan_Dwell | * | * | * | * | 0 | 0 | 0 | 0 |
| Chan_Start | 4 | 4 | 4 | 4 | 4 | 4 | 4 | 4 |
| Chan_Inc | 1 | 1 | 1 | 1 | 1 | 1 | 1 | 1 |
| Chan_Width | 4 | 4 | 4 | 4 | 4 | 4 | 4 | 4 |
| Chan_Upper | 7 | 7 | 7 | 7 | 7 | 7 | 7 | 7 |
| Addr_Start | * | * | * | * | 0 | 0 | 0 | 0 |
| Addr_Inc | * | * | * | * | 1 | 1 | 1 | 1 |
| Addr_Width | * | * | * | * | 0xffffff | 0xffffff | 0xffffff | 0xffffff |
| Addr_Upper | * | * | * | * | 0xffffff | 0xffffff | 0xffffff | 0xffffff |
| Addr_Len | * | * | * | * | 3 | 3 | 3 | 2 |
| Addr_Gap | * | * | * | * | 1 | 1 | 1 | 2 |

FIG. 5a

| Scenario "C" | | | | | | | | |
|---|---|---|---|---|---|---|---|---|
| Chan_ID | 0 | 1 | 2 | 3 | 4 | 5 | 6 | 7 |
| Block | N-1 | N-1 | N-1 | N-1 | N-1 | N-1 | N-1 | N-1 |
| Chan_Row | 26 | 26 | 26 | 26 | 26 | * | * | * |
| Chan_Dwell | 2 | 2 | 2 | 2 | 2 | * | * | * |
| Chan_Start | 0 | 0 | 0 | 0 | 0 | 0 | 0 | 0 |
| Chan_Inc | 1 | 1 | 1 | 1 | 1 | 1 | 1 | 1 |
| Chan_Width | 5 | 5 | 5 | 5 | 5 | 5 | 5 | 5 |
| Chan_Upper | 4 | 4 | 4 | 4 | 4 | 4 | 4 | 4 |
| Addr_Start | 0 | 0 | 0 | 0 | 0 | * | * | * |
| Addr_Inc | 1 | 1 | 1 | 1 | 1 | * | * | * |
| Addr_Width | 0xfffff | 0xfffff | 0xfffff | 0xfffff | 0xfffff | * | * | * |
| Addr_Upper | 0xfffff | 0xfffff | 0xfffff | 0xfffff | 0xfffff | * | * | * |
| Addr_Len | 5 | 5 | 5 | 5 | 2 | * | * | * |
| Addr_Gap | 1 | 1 | 1 | 1 | 4 | * | * | * |

| Scenario "D" | | | | | | | | |
|---|---|---|---|---|---|---|---|---|
| Chan_ID | 0 | 1 | 2 | 3 | 4 | 5 | 6 | 7 |
| Block | 62 | 62 | 62 | 62 | 62 | 62 | 62 | 62 |
| Chan_Row | 20 | 20 | 20 | 20 | 20 | 20 | 20 | 20 |
| Chan_Dwell | 0 | 0 | 0 | 0 | 0 | 0 | 0 | 0 |
| Chan_Start | 0 | 0 | 0 | 0 | 0 | 0 | 0 | 0 |
| Chan_Inc | 1 | 1 | 1 | 1 | 1 | 1 | 1 | 1 |
| Chan_Width | 8 | 8 | 8 | 8 | 8 | 8 | 8 | 8 |
| Chan_Upper | 7 | 7 | 7 | 7 | 7 | 7 | 7 | 7 |
| Addr_Start | 0 | 0 | 0 | 0 | 0 | 0 | 0 | 0 |
| Addr_Inc | 8 | 8 | 8 | 8 | 8 | 8 | 8 | 8 |
| Addr_Width | 24 | 24 | 24 | 24 | 24 | 16 | 16 | 16 |
| Addr_Upper | 23 | 23 | 23 | 23 | 23 | 15 | 15 | 15 |
| Addr_Len | 0xfffff | 0xfffff | 0xfffff | 0xfffff | 0xfffff | 0xfffff | 0xfffff | 0xfffff |
| Addr_Gap | * | * | * | * | * | * | * | * |

FIG. 5b

| Scenario "E" Block 1 | | | | | | | | |
|---|---|---|---|---|---|---|---|---|
| Chan_ID | 0 | 1 | 2 | 3 | 4 | 5 | 6 | 7 |
| Block | 9 | 9 | 9 | 9 | 9 | 9 | 9 | 9 |
| Chan_Row | 9 | * | 9 | * | 9 | * | 9 | * |
| Chan_Dwell | 0 | * | 0 | * | 0 | * | 0 | * |
| Chan_Start | 0 | 0 | 0 | 0 | 0 | 0 | 0 | 0 |
| Chan_Inc | 2 | 2 | 2 | 2 | 2 | 2 | 2 | 2 |
| Chan_Width | 8 | 8 | 8 | 8 | 8 | 8 | 8 | 8 |
| Chan_Upper | 7 | 7 | 7 | 7 | 7 | 7 | 7 | 7 |
| Addr_Start | 0 | * | 0 | * | 0 | * | 0 | * |
| Addr_Inc | 1 | * | 1 | * | 1 | * | 1 | * |
| Addr_Width | 3 | * | 3 | * | 2 | * | 2 | * |
| Addr_Upper | 2 | * | 2 | * | 1 | * | 1 | * |
| Addr_Len | 2 | * | 2 | * | 1 | * | 1 | * |
| Addr_Gap | 1 | * | 1 | * | 2 | * | 2 | * |
| Scenario "E" Block 2 | | | | | | | | |
| Chan_ID | 0 | 1 | 2 | 3 | 4 | 5 | 6 | 7 |
| Block | 9 | 9 | 9 | 9 | 9 | 9 | 9 | 9 |
| Chan_Row | * | 9 | * | 9 | * | 9 | * | 9 |
| Chan_Dwell | * | 0 | * | 0 | * | 0 | * | 0 |
| Chan_Start | 1 | 1 | 1 | 1 | 1 | 1 | 1 | 1 |
| Chan_Inc | 2 | 2 | 2 | 2 | 2 | 2 | 2 | 2 |
| Chan_Width | 8 | 8 | 8 | 8 | 8 | 8 | 8 | 8 |
| Chan_Upper | 7 | 7 | 7 | 7 | 7 | 7 | 7 | 7 |
| Addr_Start | * | 0 | * | 0 | * | 0 | * | 0 |
| Addr_Inc | * | 1 | * | 1 | * | 1 | * | 1 |
| Addr_Width | * | 3 | * | 3 | * | 2 | * | 2 |
| Addr_Upper | * | 2 | * | 2 | * | 1 | * | 1 |
| Addr_Len | * | 2 | * | 2 | * | 1 | * | 1 |
| Addr_Gap | * | 1 | * | 1 | * | 2 | * | 2 |

FIG. 5c

| Scenario "F" Block 1 | | | | | | | | |
|---|---|---|---|---|---|---|---|---|
| Chan_ID | 0 | 1 | 2 | 3 | 4 | 5 | 6 | 7 |
| Block | 62 | 62 | 62 | 62 | 62 | 62 | 62 | 62 |
| Chan_Row | 20 | 20 | 20 | 20 | 20 | 20 | 20 | 20 |
| Chan_Dwell | 0 | 0 | 0 | 0 | 0 | 0 | 0 | 0 |
| Chan_Start | 0 | 0 | 0 | 0 | 0 | 0 | 0 | 0 |
| Chan_Inc | 1 | 1 | 1 | 1 | 1 | 1 | 1 | 1 |
| Chan_Width | 8 | 8 | 8 | 8 | 8 | 8 | 8 | 8 |
| Chan_Upper | 7 | 7 | 7 | 7 | 7 | 7 | 7 | 7 |
| Addr_Start | 0 | 0 | 0 | 0 | 0 | 0 | 0 | 0 |
| Addr_Inc | 1 | 1 | 1 | 1 | 1 | 1 | 1 | 1 |
| Addr_Width | 0xfffff | 0xfffff | 0xfffff | 0xfffff | 0xfffff | 0xfffff | 0xfffff | 0xfffff |
| Addr_Upper | 0xfffff | 0xfffff | 0xfffff | 0xfffff | 0xfffff | 0xfffff | 0xfffff | 0xfffff |
| Addr_Len | 2 | 2 | 2 | 2 | 2 | 1 | 1 | 1 |
| Addr_Gap | 2 | 2 | 2 | 2 | 2 | 3 | 3 | 3 |
| Scenario "F" Block 2 | | | | | | | | |
| Chan_ID | 0 | 1 | 2 | 3 | 4 | 5 | 6 | 7 |
| Block | 7 | 7 | 7 | 7 | 7 | 7 | 7 | 7 |
| Chan_Row | 7 | 7 | 7 | 7 | 7 | 7 | 7 | 7 |
| Chan_Dwell | 0 | 0 | 0 | 0 | 0 | 0 | 0 | 0 |
| Chan_Start | 5 | 5 | 5 | 5 | 5 | 5 | 5 | 5 |
| Chan_Inc | 1 | 1 | 1 | 1 | 1 | 1 | 1 | 1 |
| Chan_Width | 8 | 8 | 8 | 8 | 8 | 8 | 8 | 8 |
| Chan_Upper | 7 | 7 | 7 | 7 | 7 | 7 | 7 | 7 |
| Addr_Start | 3 | 3 | 3 | 3 | 3 | 2 | 2 | 2 |
| Addr_Inc | 1 | 1 | 1 | 1 | 1 | 1 | 1 | 1 |
| Addr_Width | 0xfffff | 0xfffff | 0xfffff | 0xfffff | 0xfffff | 0xfffff | 0xfffff | 0xfffff |
| Addr_Upper | 0xfffff | 0xfffff | 0xfffff | 0xfffff | 0xfffff | 0xfffff | 0xfffff | 0xfffff |
| Addr_Len | 0 | 0 | 0 | 0 | 0 | 0 | 0 | 0 |
| Addr_Gap | 4 | 4 | 4 | 4 | 4 | 4 | 4 | 4 |

FIG. 5d

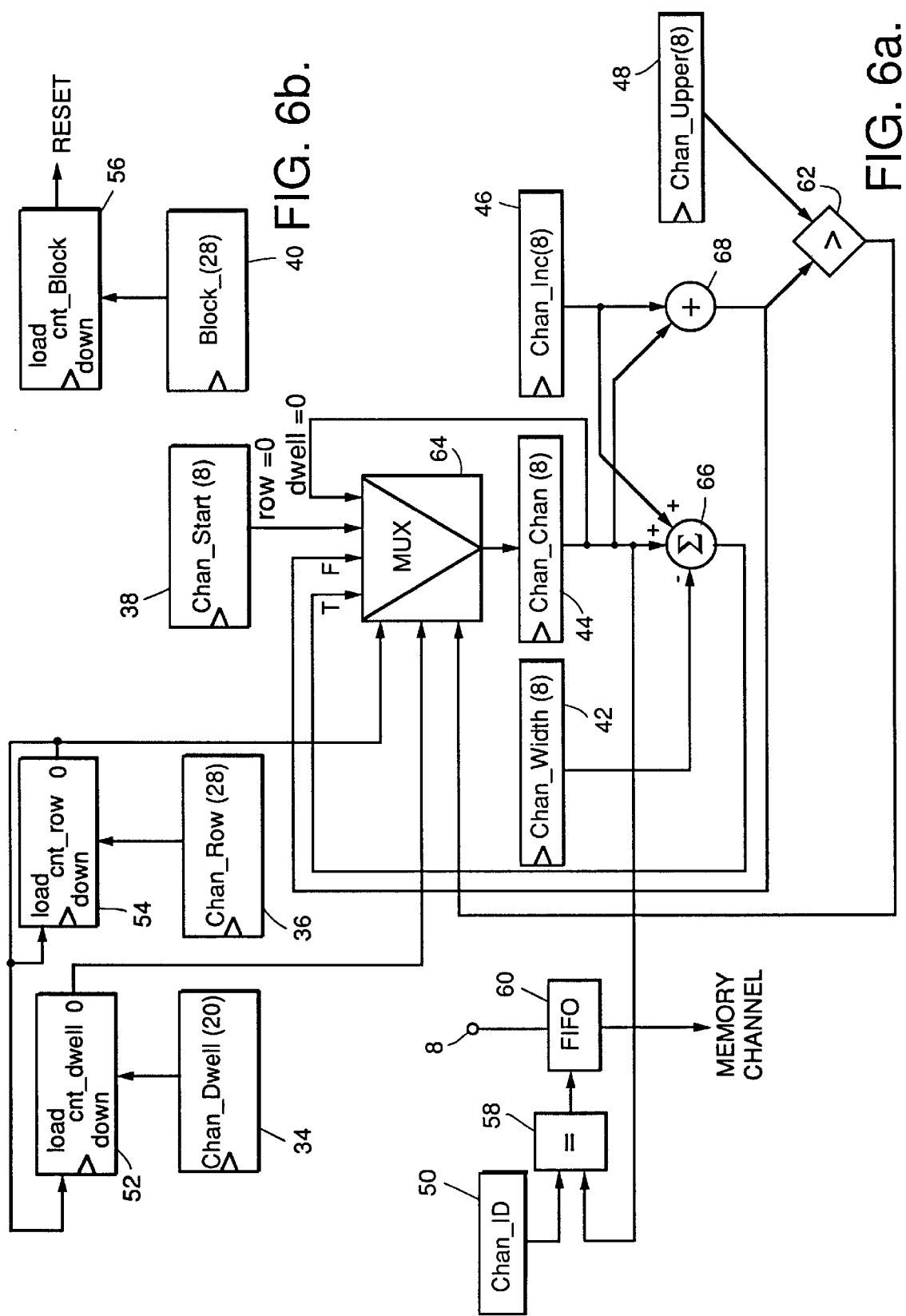

DATA FORMATTING METHOD AND APPARATUS FOR A DATA PROCESSING ARRAY

BACKGROUND OF THE INVENTION

1. Field of the Invention

This invention relates to data processors intended for a single instruction, multiple data (SIMD) mode operation, and more particularly to a method and apparatus for formatting data supplied to or received from this type of processor.

2. Description of the Related Art

Array processors consisting of multiple processing units controlled by a single controller in SIMD mode are capable of very high performance, in both systolic and cellular computations. Data is provided to the processor as a wordstream, and treated as a one-dimensional array. Most of the reformatting transformations necessary to map the data into the proper locations in the array occur in the function and computational section of the array processor, resulting in a significant performance degradation.

Reformatting is required whenever the input data format does not correspond to the desired data mapping for a particular algorithm. Although the processor's structure is computationally powerful, its performance is degraded by the processor time spent reformatting data.

SUMMARY OF THE INVENTION

The present invention seeks to provide a reformatting method and apparatus for a SIMD array processor that provides for easy and flexible reformatting of data delivered to and received from the processor, with the reformatting performed in parallel with array computations to save total computation time.

These goals are achieved by performing the reformatting external to the processor array (PA), in a separate multi-channel memory whose channels map to the rows and columns of the array. Input data is mapped into a two-dimensional array within the external memory, similar to the two-dimensional array of processing elements (PEs). This increases the flexibility of the processing array so that useful algorithms can be implemented more easily, without having to internally reformat the data. The reformatting scheme also works for data flows in the opposite direction.

The invention can be generalized to a method of transmitting data between an input/output (I/O) port and the external memory, between the memory and the PA, and directly between the I/O port and the PA. At one end of the transmission the data is established in a wordstream format, and at the other end in a positional format of data words. For data transmissions between the I/O port and the external memory, the positional format is at the memory end and is established by specifying respective memory channels and particular addresses within those channels for each data word in the wordstream. For data transmissions between the memory channels and the corresponding PA rows and columns, the positional format at the memory end is established by specifying a memory address for each data word; channel addresses are unnecessary because the data flow with a given memory channel is constrained to the corresponding PA channel. For transmissions between the I/O port and the PA, the positional format is established at the PA end by specifying a PA row and column for each data word in the I/O port wordstream; there is no address specification since all data flows into or out of the PA through edge PEs.

A data processing system which incorporates the invention includes a PA capable of being programmed to run SIMD algorithms, external multi-address memory channels that map to the PA row and column edge PEs and establish a matrix of memory channels and addresses, a communication line for communicating word stream data with the memory channels, and a data formatter that assigns respective memory positions in the matrix to different data words in a wordstream on the communication line; the correlation between the data words and the memory positions to which they are assigned depends upon the nature of the algorithm to be run by the PA. Data words are assigned to respective memory channels and addresses based upon a series of programmable format specifiers. Each of the controller channels acts independently in a SIMD manner and has no interconnections to the other controller channels, yet can be programmed to achieve a cooperative reformatting of both input and output data.

These and other features and advantages of the invention will be apparent to those skilled in the art from the following detailed description, taken together with the accompanying drawings.

BRIEF DESCRIPTION OF THE DRAWINGS

FIG. 4 is a series of diagrams illustrating six possible scenarios of data reformats within an eight-channel external memory;

FIG. 5a is a table of the channel and address specifiers for scenarios A and B of FIG. 4;

FIG. 5b is a table of the channel and address specifiers for scenarios C and D of FIG. 4;

FIG. 5c is a table of the channel and address specifiers for the two data blocks of scenario E of FIG. 4;

FIG. 5d is a table of the channel and address specifiers for the two data blocks in scenario F of FIG. 4;

FIGS. 6a and 6b are block diagrams of the channel generator logic employed in each memory channel.

DETAILED DESCRIPTION OF THE INVENTION

Figure 3:
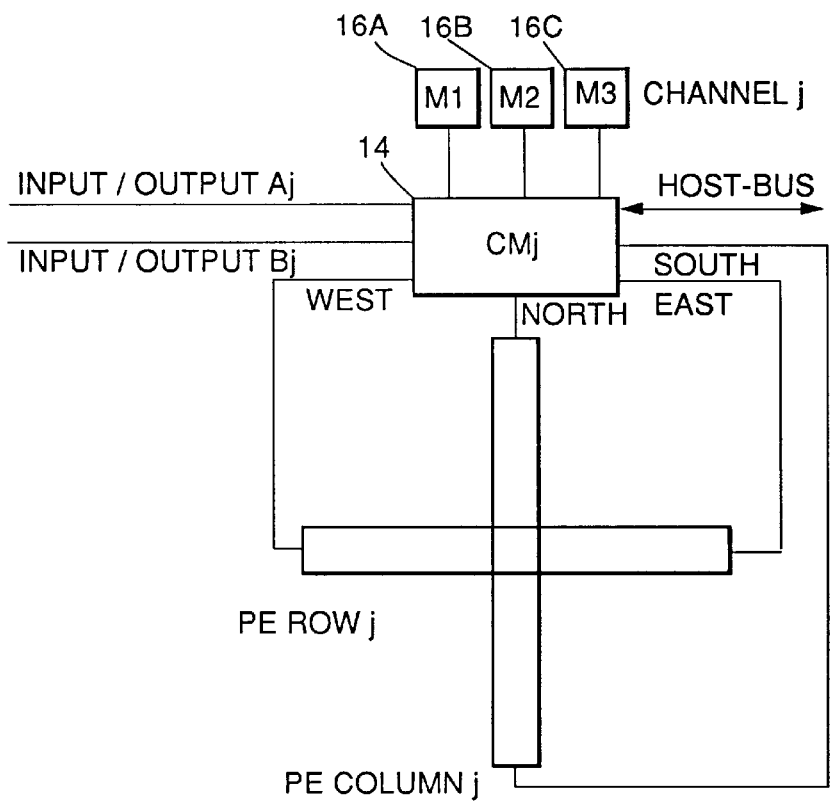
FIG. 3 is a block diagram illustrating the permissible interconnections that can be established by an individual controller module of FIG. 2.

This invention is particularly applicable to a novel data processing system that is the subject of a copending patent application by Rosen et al., "Data Processor With Dynamic And Selectable Interconnections Between Processor Array, External Memory And I/O Ports", filed on the same day as this application and assigned to the same assignee Hughes Aircraft Company. The system presents an architecture that dynamically interconnects a single PA with external memory and I/O ports to produce a highly efficient operation that avoids extensive processor idle periods, can be implemented with multiple PEs on a single chip, and does so with a lower cost, lower power and lower volume memory system. Its principal features are shown in FIGS. 1–3.

Figure 1:
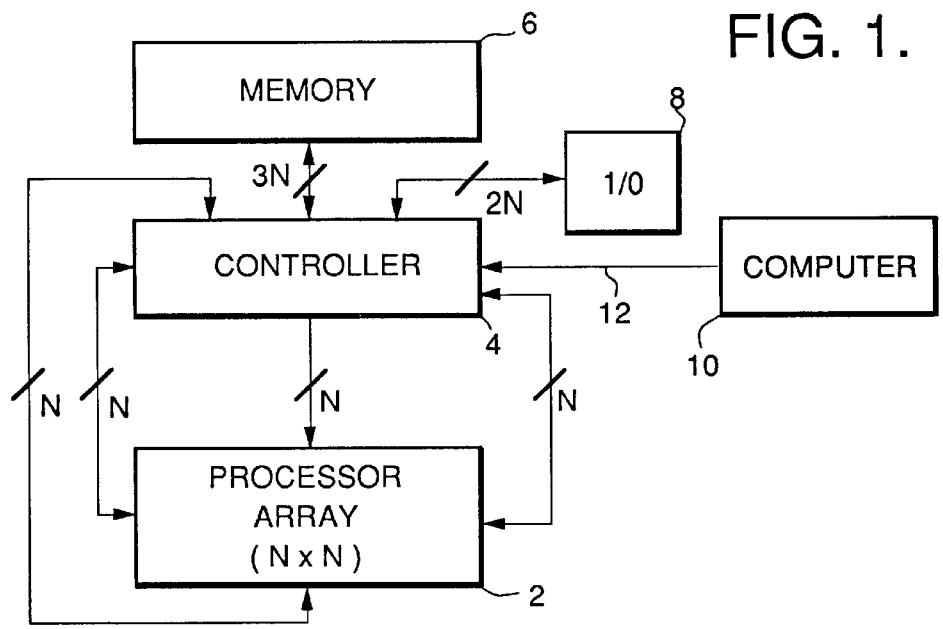
FIG. 1 is a simplified block diagram of a data processing system to which the invention is applicable.

In FIG. 1 the PA 2 is generalized as an N×N array. Although N is assumed to be four for purposes of simplicity, in practice it can be considerably larger. A controller 4 provides dynamic and selectable interconnections between the edge PEs of the PA, the memories 6, and the I/O ports 8 and between the memory 6 and the I/O ports 8. The edge PEs of the array can be connected to each other in an "edge wrap-around" manner, to memory, or directly to the I/O ports. In addition, the I/O ports can be connected to memory. A host computer 10 is connected via a Host Bus 12 to provide a path for task level command/control parameters and summary information. FIG. 1 shows data-path information. An instruction sequencer that sends the instruction control information to each I/O controller and to each PE would also be provided. These SIMD instructions dynamically govern the interconnections established by the controller at each successive clock.

Figure 2:
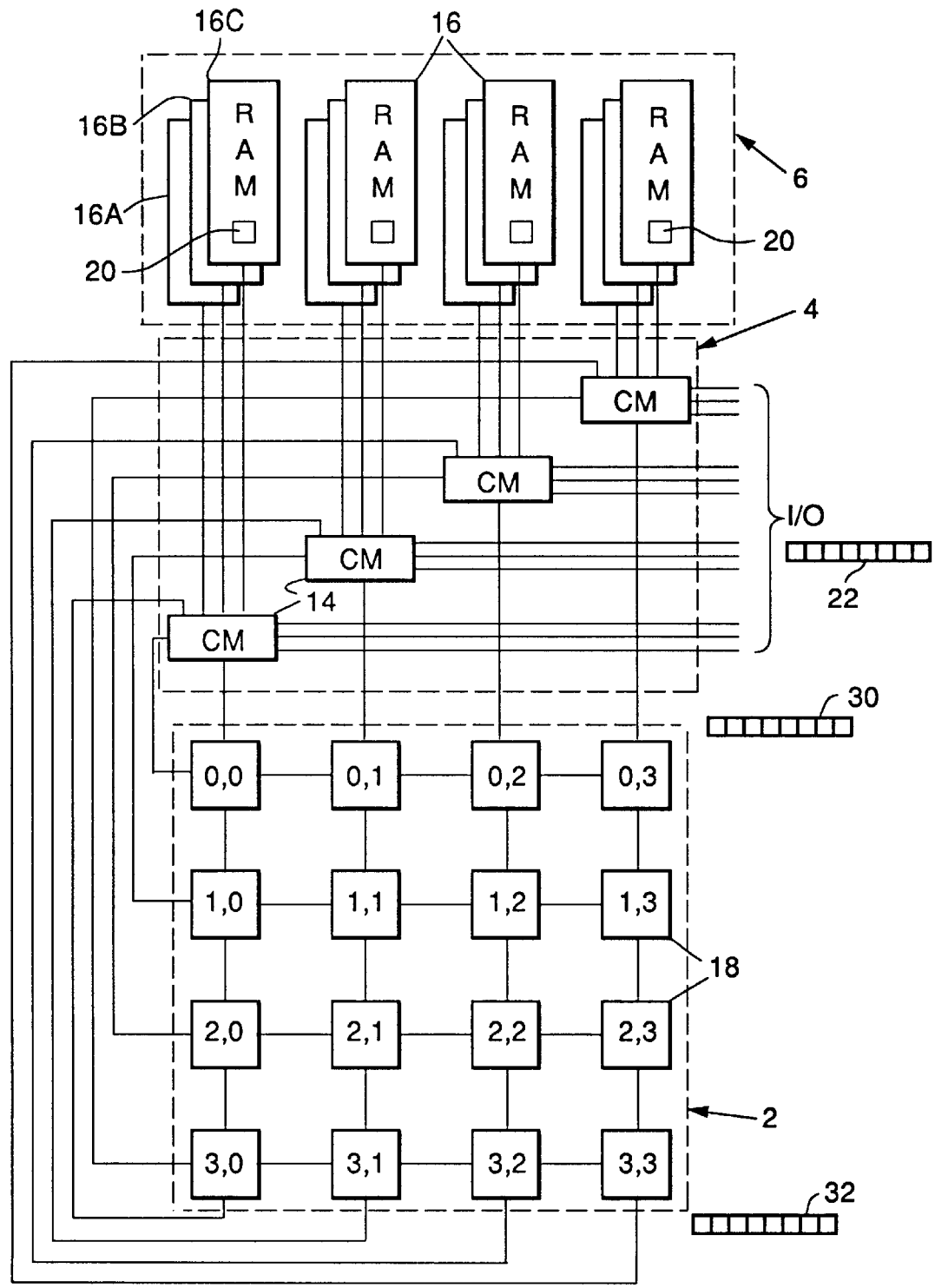
FIG. 2 is a more detailed block diagram of the FIG. 1 system, showing interconnections between the PA, controller modules, memory channels and I/O ports.

A preferred implementation of this general architecture is shown in FIG. 2. The controller 4 consists of N mutually independent controller modules 14, and the memory 6 is organized into N mutually independent memory channels 16. The memory channels in turn each consist of a number of separate memory stores 16A, 16B and 16C, which are preferably RAMs. Each memory channel is independent of the other memory channels; there is no provision for directly interconnecting one memory channel with another.

The processor array 2 consists of N columns (channels) and N rows of individual PEs 18. Each controller module 14 has selectable connections to an associated PE column/row pair, with connections to the north and south edge PEs of the associated column and to the east and west edge PEs of the associated row. The controller modules 18 also provide selectable interconnections with each of the memory stores 16A–16C in the same channel, and with each of the I/O ports. Each controller module can interconnect any of the memory stores in the same channel with any of its four edge PEs or (for example) to I/O ports to which it is connected. It can also establish interconnections between any pair of its four associated edge PEs, and between any of its four edge PEs and either of the I/O ports. No provision is made for a connection of one memory store with another in either the same or a different channel, or of one I/O port with the other I/O port. For an NxN array of PEs, each PE can be lexicographically indexed by its row and column index, PE (i,j), with indices ranging from 0 to N–1. An I/O controller module channel j, (CMj), is connected to the associated row and column edge PE pairs: PE(j,0) and PE(j,N–1); PE(0,j) and PE(N–1,j).

Although ideally four memory stores would be provided in each channel, one for each edge of the processor array, in practice this adds too many pins to the chip. The great majority of algorithms can be efficiently performed with only three memory stores per channel by using the controller modules to dynamically reconfigure the data flows between the three memory stores and the four processor array edges. At each successive clock cycle the interconnections provided by the controller modules among their respective memory stores, PEs and the I/O ports can be reconfigured to make full use of the processing capacity. The system is particularly applicable to image processing, various signal processing functions such as finite impulse response (FIR) filters, fast Fourier transforms, correlators, matrix inverters, linear algebra, and in general to data having data vector or array formats. It is not particularly suitable to algorithms in which SIMD processes perform poorly, and to applications such as compilers and word processors that are heavily data dependent and have many branches.

If it is desired for some reason to access a memory in one channel with a PE in a row or column that does not correspond to that channel, this can be done by accessing the memory with a PE in a row or column that does correspond to the channel and then moving the data to the desired row or channel within the PA.

The use of three memory stores per channel allows the channel memory to be connected to three edges of the processor array simultaneously, which can make full use of the processor capability through the use of the system's dynamic reconfiguration feature. Although theoretically only one memory store per channel could be used, in that case only one edge of the PA could be addressed at a time and the data throughput would be significantly reduced. A somewhat greater throughput could be achieved with two memory stores per channel, but it would still be significantly less than with three memory stores. Given the system's dynamic reconfiguration, any additional throughput that could be achieved by increasing the number of memory stores from three to four per channel would not be significant for the great majority of algorithms.

Each channel memory store includes a reformatting logic circuit 20 that identifies which data words in an input or output wordstream are intended for that channel, and the memory address for all such data words. The structure and operation of these logic circuits are discussed in detail below.

The data paths associated with each controller module 14 are illustrated in FIG. 3. For a controller module CMj associated with channel j, there are interconnects to the North and South edge PEs for column j in the PA, to the East and West edge PEs for row j in the PE array, to each of the memory stores 16A, 16B, 16C in channel j, and to the I/O ports $A_j$ and $B_j$. The host computer has access to the memories via the Host Bus.

Data flows into and out of the I/O ports 8 in the form of wordstreams, typically with 32 data bits per word. For both read and write operations between the I/O port 8 and the memory 6, the data is formatted as a wordstream 22 (illustrated in FIG. 2) at the I/O port. At the memory 6 it is reformatted into a channel-address matrix by assigning a particular channel to each successive data word and a particular address within the selected channel. The reformatting circuitry 20 within each memory channel identifies and "grabs" each of the data words intended for that channel, and assigns each grabbed word to the proper memory address within the channel. As explained in detail below, this is accomplished through the use of various channel and address specifiers within each reformatting circuit that establish the overall matrix pattern in which the data is stored in memory.

A complimentary process is used to read out from the memory 6 to the I/O port 8. Operating in synchronism with the other channels, each channel reformatting circuit 20 identifies the positions in the output wordstream for which a data word from its channel is desired, and the address of each desired word. Data words are supplied from the various channels in a sequence that establishes the desired wordstream as an output to the I/O port.

For a wordstream 22 at the I/O port that is to be written directly into the PA 2, the selection of the edge PE into which each successive data word is to be written is accomplished in a similar manner with simplified reformatting circuitry imbedded in the edge PEs of the PA. Since all of the incoming data is fed only into the edge PEs for its associated channels, there is no need for any address reformatting.

Reading out from the same edge PEs to the I/O port is accomplished from the South or East edge of the PA, and channel select reformatting circuitry is provided in the South and East edge PEs for this purpose. Each reformatting circuit on the South and East edges is programmed to read out the data held by its edge PE in coordination with readouts from the other edge PEs to establish the desired output wordstream.

To read out from a given memory channel into the corresponding row and column edge PEs, the reformatting circuit for the memory channel is programmed to select a particular sequence of addresses from which to read out, along with the timing for the readouts. The resulting data is delivered to the corresponding edge PE as a wordstream 30, which may include time gaps between successive words.

Each memory channel can transfer data only to its corresponding row and column edge PEs. Similarly, readouts from the South and East edges of the PA for delivery to the memory are performed independently for each column and row. The readouts again provide individual wordstreams 32 that may have time gaps between their successive data words. These wordstreams are transmitted to their respective memory channels, where they are translated into a positional format for the memory by the memory reformatting circuits assigning respective address positions to each received data word.

Each RAM store in a given memory channel will include its own reformatting circuit, and may communicate with different I/O ports and different edges of the PA from the other RAM stores in the same channel. There are typically N channels for an NxN processing array of PEs, but the invention is also applicable to different array geometries, both two and three-dimensional, and to other than a one-to-one correspondence between the number of channels and the number of edge PEs in the array.

One of the features of the invention that makes it very flexible and easy to use is that the reformatting circuits 20 are reprogrammable, requiring only a new set of instructions from the host computer to alter the reformatting procedure when a new algorithm is to be run on the PA. A change can thus be made from one algorithm to another simply and quickly.

Figure 4:
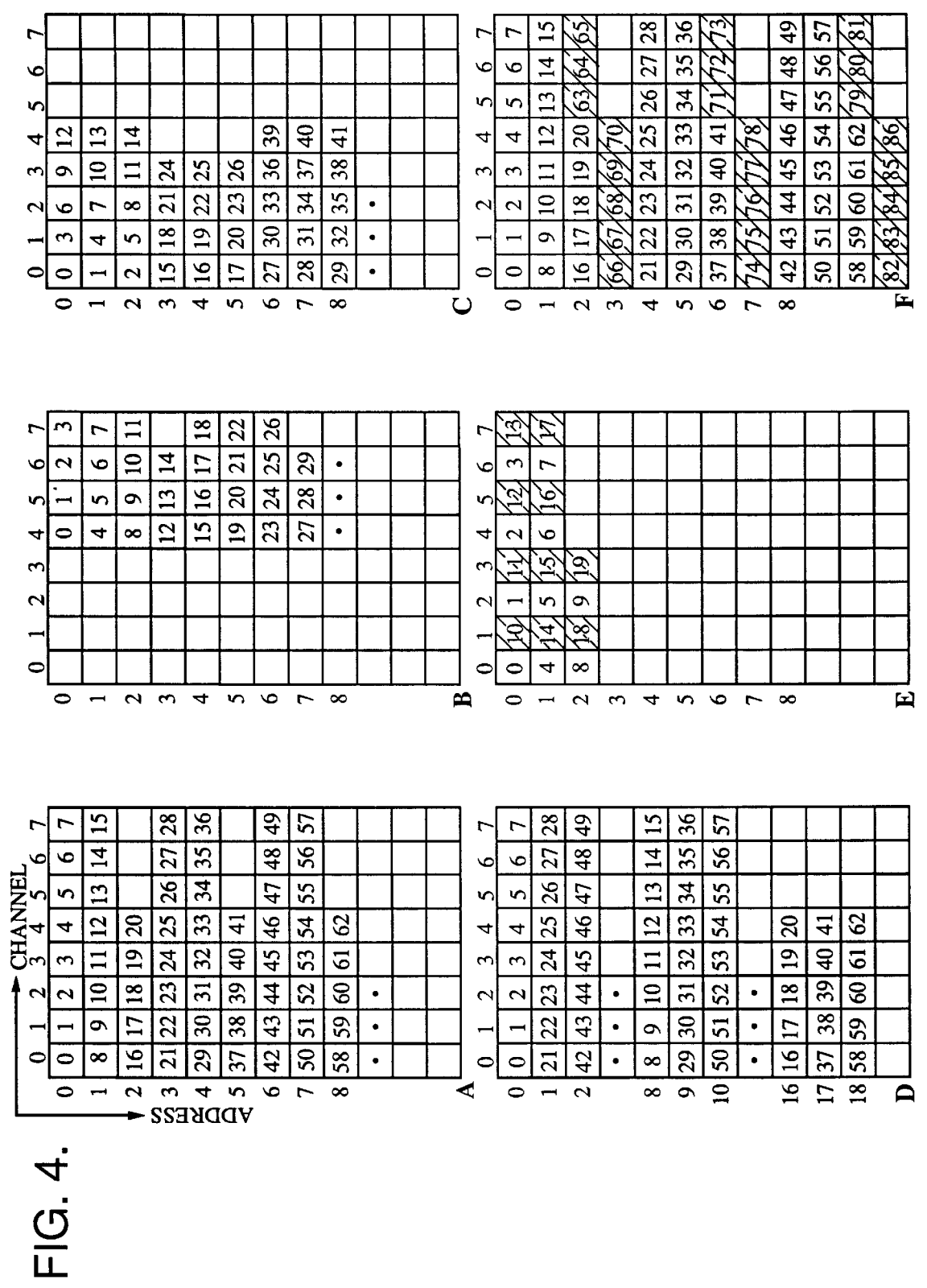

FIG. 4 gives six exemplary scenarios, labelled A–F, of data reformatting that can be accomplished in the memory, prior to inputting the data into the PA, to relieve the PA of the reformatting duty and to allow it to operate closer to its capability for processing operations. In these diagrams an eight channel memory is assumed, with each channel shown as a vertical column. A large number of data word addresses, indicated by the boxes within each column, are provided for each channel; typically on the order of one million addresses may be provided per channel. The number within each address box of FIG. 4 indicates the order within the incoming wordstream of the data word that is assigned to that address; "0" is the first data word, "1" is the second data word, etc. For data that already resides in the memory and is to be read out into a wordstream, the address box numbers indicate the order of readout.

An important characteristic of the preferred reformatting procedure is that the number of instructions that need to be executed in each channel reformatting circuit to define the parameters of a transfer should be minimized. To accomplish this, as many of the parameters as possible should be global and apply to all channels. Since each channel is independent and does not communicate with the other channels, it must make local control/addressing decisions. Each channel knows:

1) Its "Channel ID";

2) When the transfer of a data block started (via a sync signal); and

3) By counting, how many input words have been seen by the channel.

The channels achieve independent behavior by masking the effect of selected load parameter instructions to the channel controllers. This allows differing channels to have differing parameter values.

The address generation for inputting data into the memory can be considered to be a two-dimensional matrix, channelxaddress, where address is the linear address space within a channel. Referring first to example A of FIG. 4, a wordstream reformatting is illustrated in which 62 data words are spread across the memory columns in raster scan fashion, except the scanning is stopped at the end of each twenty-one words and restarted at the next address of channel 0. This type of reformatting is useful for general image processing applications. In example B data is entered in raster scan fashion into only the four highest order channels (4–7), leaving the first four channels (0–3) open. This allows for a separate wordstream to be reformatted into channels 0–3, representing perhaps a separate image, with the two images in channel 0–3 and 4–7 processed in parallel.

In scenario C the raster scanning is modified by entering three consecutive words into the same channel before proceeding to the next channel. This type of reformatting could be used for color images, with the three data words entered into three successive addresses in the same channel representing the red, blue and green components of a particular pixel.

Scenario D does not relate to any particular application, but is presented to illustrate the flexibility of the reformatting procedure. Successive data words are entered into the "0" address for successive channels, but the data entry is skipped down by eight addresses each time the address for the last channel has been filled. After reaching the lower limit of the matrix, the data entries "wrap around" back up to the next highest unoccupied address.

In scenario E two blocks of different data are interweaved with each other in raster scan fashion, with one data block occupying the even numbered channels and the other data block the odd numbered channels. An example of an application for scenario E would be a complex channel in which an in-phase channel is transferred in the first block, and a quadrature channel in the second block after the first block has been received.

In scenario F two data blocks are interspersed with each other in groups of twenty-one consecutive words for the first block, followed by eight consecutive words for the second block, with each group for the first block beginning in column 0. This type of reformatting could be used for matrix inversion, or to augment an array representing one image with a second array representing an adjacent image.

Channel and address specifiers have been developed for the reformatting circuitry within each channel that tell the channel when to "grab" a data word, and the address where the grabbed word should be stored. The channel specifiers are as follows:

Chan_ID: This is the identification of each channel. Normally for eight channel systems the channel IDs would be from left to right, 0 to 7. Other values could be used for special effects such as up sampling (duplicating) data or decimating data.

Block: This gives the total number of data words in an input (or output) transfer. Blocks can be a finite or semi-infinite size. The value of Block is the number of input words (minus one) in a block. In the preferred embodiment an input word is either a thirty-two bit integer or floating point word, or a packed word that packs two sixteen bit fixed point values to a thirty-two bit word.

Chan_Row: The input wordstream can be considered to be divided into consecutive "rows". Chan_Row is the number of words in a row (minus one). For rows that are not an integer multiple of the number of channels, this information is used to place the first element of each row in the same channel. In scenario A, Chan_Row is 20.

Chan_Dwell: This is the number of sequential input words (minus one) that are placed in a channel before advancing to the next channel. In scenario C, Chan_Dwell=2.

Chan_Start: Channel IDs may range from 0 to 255. Chan_Start is the selected channel for the first word of every row. In scenario B, Chan_Start=4.

Chan_Upper: This is the uppermost channel in which data can be placed. In scenario C, Chan_Upper=4.

Chan_Width: This is the number of columns into which data is entered (plus any intervening empty columns). In scenario C, Chan_Width=5.

(Chan_Lower): This is a derived parameter equal to the difference between Chan_Upper and Chan_Width. Chan_Start and Chan_Lower are not always equal; in the shaded block of scenario F, Chan_Start=5 while Chan_Lower=0.

Chan_Inc: This is the difference in channel numbers between successive selected channels. In scenario E, Chan_Inc=2.

(Chan_Chan): Like Chan_Lower, this is derived from the other specifiers, and is not specifically included in the instruction from the host computer. It tracks the current channel being operated upon.

The following address specifiers are employed:

Addr_Start: Memory addresses may vary from 0 to 0xfffff, which is a hexadecimal notation corresponding to the maximum address (typically on the order of one million). For 20 bit addressing, memory addresses vary from 0 to 0xffff (0 to 1,048,576), where the leading "0x" indicates hexadecimal notation.

Addr_Start: This is the first memory address, which is 0 for scenarios A–F.

Addr_Upper: This corresponds to Chan_Upper, but in memory address space rather than channel select space. This specifier is for implementing circular buffers.

Addr_Width: This is similar to Chan_Width, but in memory address space rather than channel select space. It is also used to implement circular buffers.

(Addr_Lower): This is an implied specifier similar to Chan_Lower but in memory address space rather than channel select space.

Addr_Inc: This represents the difference in address between two successive values written into memory. In scenario D, Addr_Inc=8, Addr_Upper=23 and Addr_Width=23.

Addr_Len: This specifier is part of the mechanism that handles augmenting raster/arrays. It is equal to the number of words (minus one) read from the input FIFO register until the end of the row is encountered, and is used in conjunction with Addr_Gap described below. For the unshaded data block in scenario F, Addr_Len=2 for channels 0–4, and 1 for channels 5–7.

Addr_Gap: This is the address increment across an augment gap between the end of a row and the beginning of the next row. For the unshaded block in scenario F, Addr_Gap=1 for channels 0–4 and 2 for channels 5–7.

(Addr_Addr): Similar to Chan_Chan, this is a derived specifier that represents the current address to be written to or read from.

The channel/address location for any data word in an input or output wordstream can be established by these specifiers. FIGS. 5*a,* 5*b,* 5*c* and 5*d* are tables of the nonimplied specifiers that are used to establish the data reformat patterns of scenarios A and B, scenarios C and D, the two data blocks of scenario E and the two data blocks of scenario F, respectively.

FIGS. 6*a* and 6*b* show a hardware implementation of a channel select generator that can be used in the memory channel reformating circuits 20 to determine in which channel a particular word in an incoming wordstream should be placed, or the channel from which a data word for a particular position in an outgoing wordstream should be taken. It includes registers for the various channel specifiers discussed above, including Chan_Dwell 34, Chan_Row 36, Chan_Start 38, Block 40, Chan_Width 42, Chan_Chan 44, Chan_Inc 46, Chan_Upper 48 and Chan_ID 50 registers. The highest value for each register is indicated in parentheses. Count down counters 52, 54 and 56 are initially loaded with the values of Chan_Dwell, Chan_Row and Block, respectively, and count down by one increment at each clock input until reaching zero, at which time they are loaded again with the values held by their respective registers.

The values stored by the Chan_Chan register 44 and Chan_ID register 50 are compared by a comparator 58 at each clock cycle, and if they are equal data is written into the input FIFO (first in first out) register (or read out of the output buffer) of the channel. In other words, when Chan_Chan (the updated channel number into which data is to be written or from which data is to be read) is equal to the channel identification in which the particular address generator circuitry resides, that channel will either "grab" the current data word in the incoming wordstream or write out a word into an outgoing wordstream. A write signal for a FIFO register 60 comes from the comparator 58, while the data that is written into the FIFO comes from the input port.

The outputs of the Chan_Dwell and Chan_Row counters 52 and 54 are applied, along with the output of a comparator 62, as controls to a four-input multiplexer 64. The output of multiplexer 64 is applied to the Chan_Chan register 44, which keeps a running update of the channel currently being operated upon. The outputs of the Chan_Chan register 44 and Chan_Inc 46 are applied as positive inputs to a summing node 66, which also receives the output of the Chan_Width register 42 as a negative input; the output of summing node 66 is applied as a third input to the multiplexer 64.

The output of the Chan_Chan register 44 and Chan_Inc register 46 are also added together in an adder 68, which provides one of the inputs to comparator 62. The other input to comparator 62 is provided from Chan_Upper register 48. The output of adder 68 is connected as the fourth input to the multiplexer 64, and when its value exceeds that of the Chan_Upper register 48, as determined by comparator 62, a third control signal is delivered from the comparator to the multiplexer 64.

When the Chan_Row counter reaches zero the value of Chan_Start is selected by the multiplexer and stored into the Chan_Chan register 44. This feedback occurs whenever Chan_Dwell is not equal to zero. Therefore, Chan_Chan is unchanged during further entries into the same channel. To process the rest of the channels, Chan_Chan is assigned a value of Chan_Chan+Chan_Inc whenever the sum is less than Chan_Upper. However, if the sum of Chan_Chan and Chan_Inc is greater than Chan_Upper, then it is necessary to subtract Chan_Width from the Chan_Chan+Chan_Inc sum; otherwise the value of Chan_Chan will not be bounded. In summary, the channel address generator control algorithm is:

if(cnt_dwell!=0)
        then Chan_Chan=Chan_Chan
    if(cnt_row==0)
        then Chan_Chan=Chan_Start
    if(cnt_dwell!=0) and (cnt_row==0) and (Chan_Chan+Chan_Inc>Chan_Upper)
        then Chan_Chan=Chan_Chan+Chan_Inc−Chan_Width
        else Chan_Chan=Chan_Chan+Chan_Inc When a "block" of data has been received (the cnt_blk 56 counts down to 0), a reset is generated. Two modes of reset are supported. In the first mode, called semi-infinite block, when a new block of data starts to be transmitted to the input port the Block register 40 is reloaded with the "Block" parameter value, and all other registers are unchanged. This facilitates breaking large transfers into fixed size blocks for system reasons such as source buffering limits and bounds on priority inversion. The second mode is block or finite-block. In this mode, at the start of every block the Chan_Chan register is loaded with the value in Chan_Start, and all the counters are loaded with their associated register values. This starts a block transfer that places data into the same place as the previous block transfer (if the parameters remain unchanged).

The Block counter 56 also checks to see if a synchronizing signal representing the end of the data Block has been received when its count reaches zero; if the signal has not been received an error is indicated.

Figure 7:
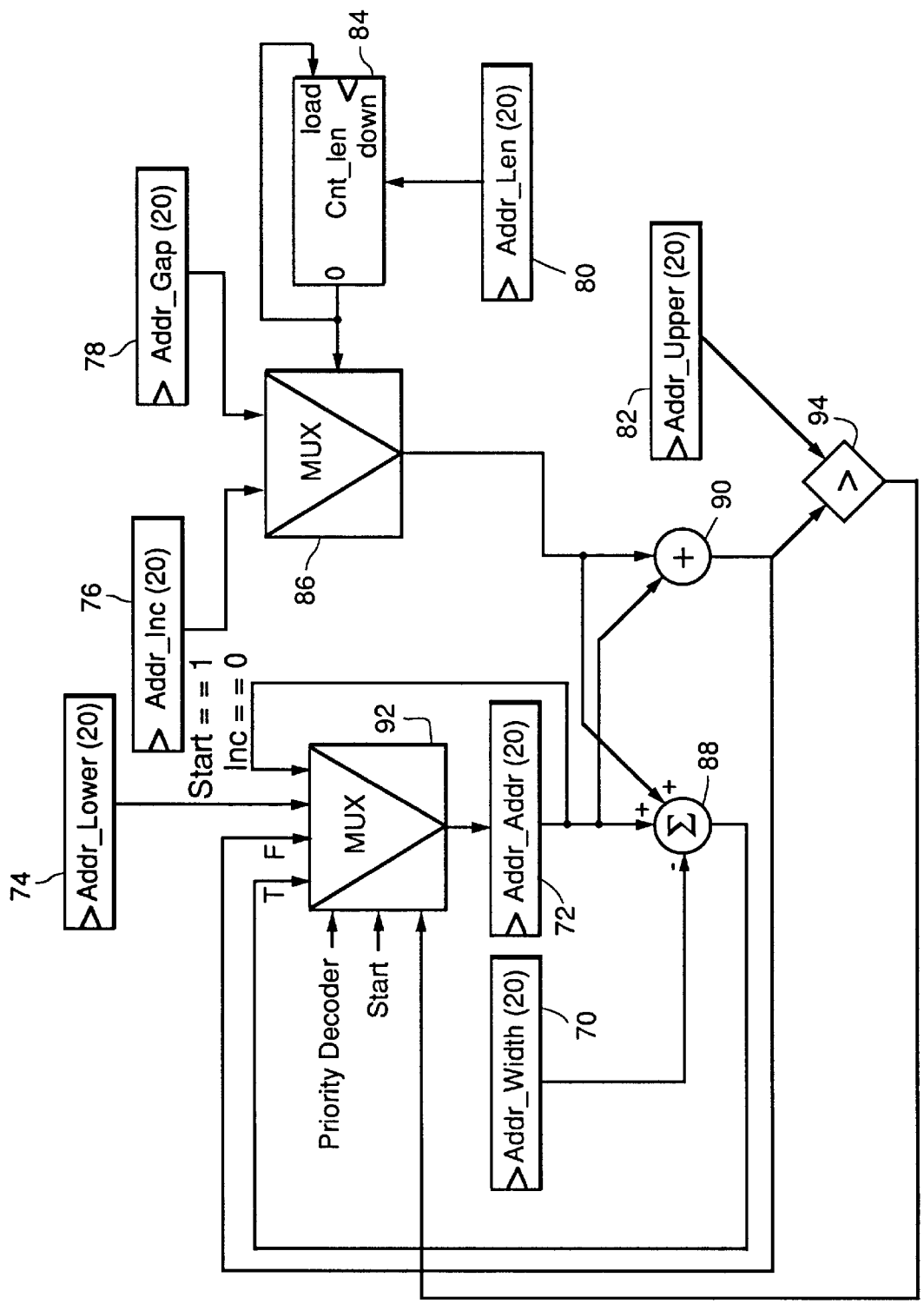
FIG. 7 is a block diagram of address generator logic employed in each memory channel.

A preferred logic circuit for the memory address generator is given in FIG. 7. It operates in a manner similar to the channel selection circuit and includes registers for Addr_Width 70, Addr_Addr 72, Addr_Lower 74, Addr_Inc 76, Addr_Gap 78, Addr_Len 80 and Addr_Upper 82. A countdown counter 84 is initially loaded with the value of the Addr_Len register 80 and counts down by one at each clock increment, with its output supplied as a control to a multiplexer 86 and also tied back to cause the counter to reload the Addr_Len value when its count has reached zero.

The multiplexer 86 selects between inputs from the Addr_Inc register 76 and the Addr_Gap register 78. Its output is provided at a positive input to a summing node 88, and to an adder 90. Summing node 88 also receives a positive input from the Addr_Addr register 72 and a negative input from the Addr_Width register 70, while adder 90 receives a second input from the Addr_Addr register 72.

The outputs of summing node 88 and adder 90 are provided as inputs to a second multiplexer 92, which also receives inputs from the Addr_Lower register 74 and the Addr_Addr register 72. The output of adder 90 is also compared with the value of the Addr_Upper register 82 by a comparator 94, which provides a control input signal to the multiplexer 92 when the output from adder 90 is higher. Multiplexer 92 also receives control inputs from a priority decoder and a start signal.

The present value of the address generator is stored in the Addr_Addr register 72. The starting value of Addr_Addr is Addr_Start, which is selected by the multiplexer 92 when the Start signal is activated. After initiating the address generator, various possibilities may occur. If Addr_Inc is equal to zero, the Addr_Addr register 72 feeds back to itself through the multiplexer 92. Whenever Addr Inc is not equal to zero, the new memory address will be a function of Addr_Width, Addr_Upper, Addr_Inc and Addr_Gap. Since the memory address is bounded by Addr Upper, the comparator 94 is required to determine which of the two feedback results will be selected. One scenario occurs when the memory address in incremented by Addr_Inc, as long as the result is less than Addr_Upper. Another scenario occurs whenever handling augmented rasters/arrays is required. In this case Addr_Gap is added to Addr_Addr, and bounded by Addr_Upper. For circular addressing, whenever the new value of Addr_Addr is greater than Addr_Upper, Addr_Width is subtracted.

FIGS. 6a/6b and 7 present preferred logic circuits to implement the channel and address selectors, but numerous other circuits could be designed for the same purpose. While an illustrative embodiment of the invention has been shown and described, numerous variations and alternate embodiments will occur to those skilled in the art. Such variations and alternate embodiments are contemplated, and can be made without departing from the spirit and scope of the invention as defined in the appended claims.

We claim:

1. A method of transmitting data between two selected elements of a data processing system whose elements comprise a single-instruction, multiple data (SIMD) processing array having a plurality of processing elements that are programmed with SIMD instructions to run a SIMD algorithm, a plurality of multi-address memory channels external to said SIMD processing array that establish a matrix of memory channels and addresses within said memory channels, and an input/output (I/O) port, comprising:

programming said SIMD processing array to run a SIMD algorithm, establishing a reformatting procedure for the selected SIMD algorithm external to said SIMD processing array to reformat data between a wordstream format and a positional format in said matrix of memory channels; and transmitting said data between a selected one of said SIMD processing array and said I/O port and said memory channels while reformatting said data between said wordstream and positional formats in accordance with said reformatting procedure.

2. The method of claim 1, wherein said data is transmitted between said memory channels and said I/O port, and said positional format is established by:

specifying a respective memory channel in said matrix for each data word in said wordstream, and specifying a respective memory address in said matrix for each data word in said wordstream in accordance with the reformatting procedure for the selected SIMD algorithm.

3. The method of claim 2, wherein said data words are read out from said memory channels to said I/O port.

4. The method of claim 2, wherein said data words are written into said memory channels from said I/O port.

5. The method of claim 2, wherein the respective memory channels for said data words are specified by the positions of said data words in said wordstream.

6. The method of claim 5, wherein the memory channel for each data word in said wordstream is programmably specified in terms of Chan_ID, Block, Chan_Row, Chan_Dwell, Chan_Start, Chan_Upper, Chan_Width and Chan_Inc.

7. The method of claim 2, wherein the respective memory addresses for said data words within their respective memory channels are specified by the positions of said data words in said wordstream.

8. The method of claim 7, wherein the memory address for each data word in said wordstream is programmably specified in terms of Addr_Start, Addr_Upper, Addr_Width, Addr_Inc, Addr_Len and Addr_Gap.

9. The method of claim 1, wherein said processing array has a plurality of edge processing elements (PEs), said data is transmitted between said memory channels and respective edge PEs of said processing array in a positional format in said memory channels and a wordstream format at said processing array, and said positional format is established by specifying a respective memory address for each data word in said wordstream.

10. The method of claim 9, wherein said data words are read out from said memory channels to respective edge PEs.

11. The method of claim 9, wherein said data words are written into said memory channels from respective edge PEs.

12. The method of claim 9, wherein the respective memory addresses for said data words within their respective memory channels are specified by the positions of said data words in said wordstream.

13. The method of claim 12, wherein the memory address for each data word in said wordstream is programmably specified in terms of Addr_Start, Addr_Upper, Addr_Width, Addr_Inc, Addr_Len and Addr_Gap.

14. The method of claim 1, wherein said processing array has a plurality of edge processing elements (PEs), said data is transmitted between said I/O port and said edge PEs in a positional format at said processing array and a wordstream format at said I/O port, and said positional format is established by specifying respective edge PEs for the data words in said wordstream.

15. The method of claim 14, wherein said data words are read out from respective edge PEs to said I/O port.

16. The method of claim 14, wherein said data words are written into respective edge PEs from said I/O port.

17. The method of claim 14, wherein the respective edge PEs for said data words are specified by the positions of said data words in said wordstream.

18. The method of claim 17, wherein the edge PE for each data word in said wordstream is programmably specified in terms of Chan_ID, Block, Chan_Row, Chan_Dwell, Chan_Start, Chan_Upper, Chan_Width and Chan_Inc.

19. A method of communicating wordstream data with a memory for a single instruction, multiple data (SIMD) processing array that is programmable to execute different SIMD algorithms, comprising:

providing a plurality of multi-address memory channels external to said data processing array to establish a matrix of memory channels and addresses within said channels, providing a plurality of reformatting circuits external to said SIMD processing array that act independently to select particular sequences of addresses in the respective memory channels, said reformatting circuits being programmable to achieve a cooperative reformatting in accordance with a particular SIMD algorithm, selecting a SIMD algorithm to be run by the SIMD processing array, and executing a SIMD instruction so that said reformatting circuits' cooperative reformatting corresponds to the selected SIMD algorithm, said reformatting circuits:

specifying a respective memory channel for each data word in a wordstream, specifying a respective memory address within its respective memory channel for each data word in said wordstream, and communicating data words between said wordstream and their respective memory channels and addresses.

20. The method of claim 19, wherein said data words are communicated by writing them from an input wordstream into said memory channels.

21. The method of claim 19, wherein said data words are communicated by reading them from said memory channels to an output wordstream.

22. The method of claim 19, wherein said processing array has a plurality of edge processing elements (PEs), further comprising the step of communicating said data words between said memory channels and respective edge PEs.

23. The method of claim 19, wherein said data words are communicated in a wordstream sequence.

24. The method of claim 23, wherein the respective memory channels with which said data words are communicated are specified by the positions of said data words in said wordstream.

25. The method of claim 24, wherein the memory channel for each data word in said wordstream is programmably specified in terms of Chan_ID, Block, Chan_Row, Chan_Dwell, Chan_Start, Chan_Upper, Chan_Width and Chan_Inc.

26. The method of claim 23, wherein the respective memory addresses within the memory channels with which said data words are communicated are specified by the positions of said data words in said wordstream.

27. The method of claim 26, wherein the memory address for each data word in said wordstream is programmably specified in terms of Addr_Start, Addr_Upper, Addr_Width, Addr_Inc, Addr_Len and Addr_Gap.

28. A method of supplying data to a single instruction, multiple data (SIMD) processing array which has a plurality of edge processing elements (PEs), comprising:

executing a SIMD instruction that configures a plurality of reformatting circuits to achieve a cooperative reformatting in accordance with a desired SIMD algorithm to be run by said SIMD processing array, loading wordstream data words into multiple memory channels that are external to, and have a one-to-one correspondence with, respective sets of edge PEs, in a positional format in accordance with said cooperative reformatting, reformatting said data words from said memory channels into a wordstream with a wordstream format, loading said data words from said wordstream into said SIMD processing array, running said algorithm with said SIMD processing array upon said loaded data words, subsequently executing a different SIMD instruction to reconfigure said reformatting circuits to achieve a cooperative reformatting in accordance with a different SIMD algorithm, loading a different set of wordstream data words into said memory channels in a different positional format in accordance with said cooperative reformatting, reformatting said different set of data words from said memory channels into a wordstream with a different wordstream format, loading said data words from said wordstream into said SIMD processing array, and running different SIMD algorithm with said SIMD processing array upon said different loaded data words.

29. The method of claim 28, wherein for each of said memory channels the data words loaded into said memory channel are specified independent of the other memory channels.

30. The method of claim 28, wherein the respective memory channels into which said data words are loaded are specified by the positions of said data words in said wordstream.

31. The method of claim 30, wherein the memory channel for each data word in said wordstream is programmably specified in terms of Chan_ID, Block, Chan_Row, Chan_Dwell, Chan_Start, Chan_Upper, Chan_Width and Chan_Inc.

32. The method of claim 28, wherein for each of said memory channels the respective addresses into which the channel's data words are loaded are specified by the positions of said data words in said wordstream.

33. The method of claim 32, wherein the memory address for each data word in said wordstream is programmably specified in terms of Addr_Start, Addr_Upper, Addr_Width, Addr_Inc, Addr_Len and Addr_Gap.

34. A data processing system, comprising:
- a single instruction, multiple data (SIMD) processing array that has a plurality of edge processing elements (PEs) and is capable of being programmed to run different SIMD algorithms,
- respective multi-address memory channels corresponding to respective sets of said edge PEs but external to said data processing array, and establishing a matrix of memory channels and addresses within said memory channels,
- a communications line for communicating wordstream data with said memory channels, and
- a data formatter external to said SIMD processing array that assigns respective memory positions in said matrix to different data words for a data wordstream on said communications line, with the correlation between said data words and the memory position to which they are assigned depending upon the nature of the particular SIMD algorithm to be run by said SIMD processing array, said data formatter being reprogrammable to alter the formatting procedure when a different algorithm is to be run on said SIMD processing array.

35. The data processing system of claim 34, wherein said communications line comprises an input line for writing wordstream data into said memory channels.

36. The data processing system of claim 34, wherein said communications line comprises an output line for reading wordstream data out from said memory channels.

37. The data processing system of claim 34, wherein said communications line comprises an input/output line for writing wordstream data into or reading wordstream data out of said memory channels.

38. The data processing system of claim 34, wherein said data formatter assigns said memory positions according to the respective positions of said data words in said wordstream.

39. The data processing system of claim 38, wherein said data formatter assigns said data words to respective memory channels based upon the programmable format specifiers Chan_ID, Block, Chan_Row, Chan_Dwell, Chan_Start, Chan_Lower, Chan_Upper, Chan_Width, Chan_Inc, and Chan_Chan.

40. The data processing system of claim 39, said data formatter including respective registers for storing said specifiers, and logic circuitry for applying specifiers stored in said registers to a wordstream to determine said memory channel assignments.

41. The data processing system of claim 38, wherein said data processor assigns said data bits to respective addresses within their respective memory channels based upon the programmable format specifiers Addr_Start, Addr_Lower, Addr_Upper, Addr_Width, Addr_Inc, Addr_Addr, Addr_Len and Addr_Gap.

42. The data processing system of claim 41, said data formatter including respective registers for storing said specifiers, and logic circuitry for applying specifiers stored in said registers to a wordstream to determine said memory address assignments.

* * * * *